United States Patent

Hamada et al.

[11] Patent Number: 5,323,989
[45] Date of Patent: Jun. 28, 1994

[54] METHOD OF SUPPORTING EXHAUST PIPE FOR MOTOR VEHICLE AND SUPPORT STRUCTURE FOR EFFECTING THE METHOD

[75] Inventors: Masaaki Hamada; Yumi Sekiguchi; Hiroshi Kakimoto, all of Komaki, Japan

[73] Assignee: Tokai Rubber Industries, Ltd., Japan

[21] Appl. No.: 826,949

[22] Filed: Jan. 27, 1992

[30] Foreign Application Priority Data

Jan. 28, 1991 [JP] Japan .................................. 3-027928

[51] Int. Cl.$^5$ ............................................. E21F 17/02
[52] U.S. Cl. ..................................... 248/60; 180/296; 180/309; 285/226
[58] Field of Search ............... 180/309, 296; 248/58, 248/59, 60, 49; 285/226

[56] References Cited

U.S. PATENT DOCUMENTS

| | | | |
|---|---|---|---|
| 3,173,710 | 3/1965 | Kinnison | 180/309 X |
| 3,942,599 | 3/1976 | Shimada | 248/60 X |
| 3,963,087 | 6/1976 | Grosseau | 180/309 |
| 4,676,332 | 1/1987 | Saito | 248/60 X |
| 4,796,841 | 1/1989 | Baker et al. | 248/60 |
| 4,860,644 | 8/1989 | Kohl et al. | 285/226 X |
| 5,083,817 | 1/1992 | Holzhausen et al. | 285/226 X |
| 5,127,489 | 7/1992 | Takato et al. | 180/309 |

*Primary Examiner*—Ramon O. Ramirez
*Attorney, Agent, or Firm*—Parkhurst, Wendel & Rossi

[57] ABSTRACT

A method of supporting an exhaust pipe for an engine of a motor vehicle, on a vehicle body is disclosed. Initially, the exhaust pipe is formed such that the pipe is flexible at an intermediate point thereof in the vicinity of a rear axle of the vehicle, on which a nodal point of a primary natural vibration mode of the vehicle lies. The exhaust pipe has a rear section which extends rearwards from the intermediate point. Then, the rear section of the exhaust pipe is elastically supported on the vehicle body, such that the rear section is oscillatable about the intermediate point relative to the vehicle body. With a natural frequency of the rear section of the exhaust pipe tuned to a primary natural frequency of the vehicle body, the rear section of the pipe serves as a dynamic damper for the vehicle body. Also disclosed is a support structure for supporting the exhaust pipe in the manner described above.

6 Claims, 2 Drawing Sheets

METHOD OF SUPPORTING EXHAUST PIPE FOR MOTOR VEHICLE AND SUPPORT STRUCTURE FOR EFFECTING THE METHOD

BACKGROUND OF THE INVENTION

1. Field of the Invention

The present invention relates to a novel technique associated with a support structure for supporting an engine exhaust pipe on a body of a motor vehicle, while reducing vibrations of the vehicle body.

2. Discussion of the Prior Art

As is well known in the art, while a motor vehicle is running or in an engine idling condition, a body of the vehicle is subjected to shakes from a drive line including an engine, and/or shakes applied from a road surface through a suspension system, whereby bending or flexural vibrations take place in the vehicle body. The bending or flexural vibrations of the vehicle body cause vibrations of a floor panel, a steering shaft and other members of the vehicle, resulting in reduction in the driving comfort and controllability of the vehicle.

To solve the above problem, the motor vehicle conventionally employs vibration isolating members made of rubber, for example, which are interposed between the vehicle body and the drive line members such as an engine and a muffler, and between the vehicle body and components of the suspension system such as suspension rods and arms. The vibration isolating members are intended to prevent transmission of the vibrations from the drive line and suspension system to the vehicle body, so as to reduce the vibrations of the vehicle body.

However, the above-described vibration isolating members are not satisfactory in their vibration isolating effect. It is known that the transmission of vibrations to the vehicle body may be effectively reduced by lowering the spring constant of such vibration isolating members. However, the vibration isolating members must flexibly support the drive line and suspension system, and are therefore required to have some degree of stiffness. Further, vibration isolating members having an excessively soft spring characteristic are likely to cause the vehicle body to shake or rock, for example, and thereby deteriorate the stability and controllability of the vehicle- Thus, it has been extremely difficult for such vibration isolating members to obtain a sufficiently high vibration isolating effect.

SUMMARY OF THE INVENTION

It is therefore a first object of the present invention to provide a method of flexibly supporting an engine exhaust pipe on a body of a motor vehicle, which method is also effective to reduce vibrations which take place in the vehicle body.

It is a second object of the invention to provide a support structure for flexibly supporting the exhaust pipe on the vehicle body, which structure includes a dynamic damper for reducing the vibrations of the vehicle body.

The first object may be attained according to one aspect of the present invention, which provides a method of supporting an exhaust pipe for an engine of a motor vehicle, on a vehicle body, the method comprising the steps of: (a) forming the exhaust pipe such that the exhaust pipe is flexible at an intermediate point thereof in the vicinity of a rear axle of the vehicle, the vehicle body having a primary natural vibration mode having a nodal point on the rear axle of the vehicle, the exhaust pipe having a rear section which extends rearwards from the intermediate point; (b) elastically supporting the rear section of the exhaust pipe on the vehicle body, such that the rear section is oscillatable about the intermediate point relative to the vehicle body; and (c) tuning a natural frequency of the rear section of the exhaust pipe to a primary natural frequency of the vehicle body, so that the rear section of the exhaust pipe serves as a dynamic damper for the vehicle body.

The second object may be attained according to another aspect of the present invention, which provides a support structure for supporting an exhaust pipe for an engine of a motor vehicle on a vehicle body, comprising: (a) a rear flexible joint disposed so as to connect flexibly an intermediate and a rear section of the exhaust pipe, the rear flexible joint being located in the vicinity of a rear axle of the vehicle, the vehicle body having a primary natural vibration mode having a nodal point on the rear axle of the vehicle, the rear section extending rearwards from the rear flexible joint; and (b) support means for elastically supporting the exhaust pipe on the vehicle body, at a plurality of points of the exhaust pipe on the opposite sides of the rear flexible joint, the support means including at least one spring member which cooperates with the rear section of the exhaust pipe and the rear flexible joint to constitute a vibration system having a natural frequency which is tuned to a primary natural frequency of the vehicle body, whereby the vibration system serves as a dynamic damper for the vehicle body.

According to the above two aspects of the present invention, the rear portion of the exhaust pipe which is elastically connected to the vehicle body effectively functions as a dynamic damper for damping vibrations which take place in the vehicle body. Thus, the support structure of the invention is adapted not only to avoid transmission of vibrations from the drive line or suspension system toward the vehicle body, but also positively to avoid and effectively reduce vibrations of the vehicle body.

Further, according to the present invention, the dynamic damper for the vehicle body is constituted only by the rear portion of the exhaust pipe, the rear flexible joint, and the spring member or members supporting the rear portion. Thus, the provision of the dynamic damper does not require any exclusive member to be added, thereby making the obtained dynamic damper considerably simple in construction.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
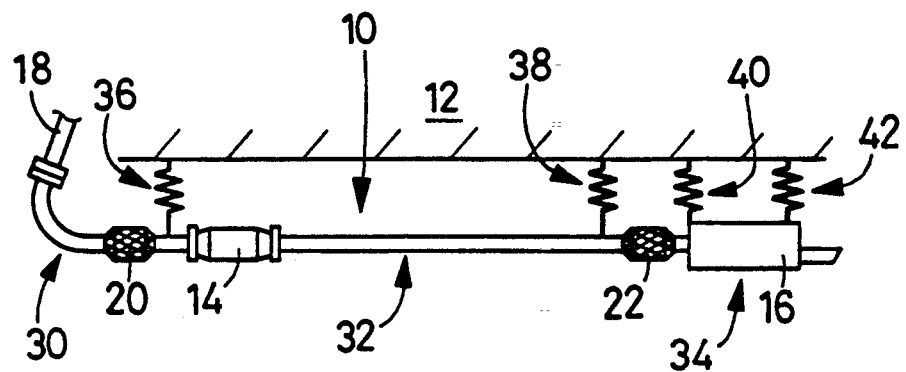
FIG. 1 is an explanatory view schematically showing one embodiment of a support structure of the present invention, for flexibly connecting an engine exhaust pipe to a vehicle body.

Referring first to FIG. 1, reference numeral 10 generally denotes an exhaust pipe which is disposed below a body 12 of a motor vehicle so as to extend in the running direction of the vehicle (i.e., in the horizontal direction as viewed in FIG. 1). The exhaust pipe 10 is provided with a catalytic converter 14 which is located a suitable length frontwardly of the middle of the pipe 10. Further, a main muffler 16 is provided in a rear end portion of the exhaust pipe 10. This exhaust pipe 10 is connected at its front end to an exhaust manifold 18 of a vehicle engine (not shown), so as to deaden the noise produced by exhaust gases from the engine while purifying the exhaust gases, so that the purified gases are discharged from the rear end of the pipe 10.

Figure 2:
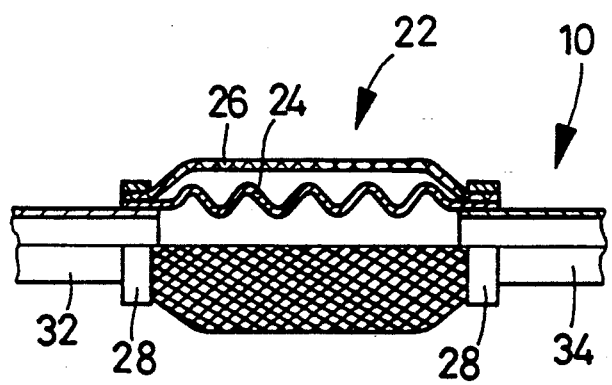
FIG. 2 is an enlarged half-sectional and half-elevational view showing a flexible joint used in the support structure of FIG. 1.

The exhaust pipe 10 is split or divided into three sections, namely, a front section 30 which terminates ahead of the catalytic converter 14, an intermediate section 32 which has the catalytic converter 14 and terminates ahead of the main muffler 16, and a rear section 34 having the main muffler 16. The three sections 30, 32, 34 are connected to each other by front and rear flexible joints 20, 22, such that the exhaust pipe 10 is flexible, i.e., may be bent or flexed at the flexible joints 20, 22. As shown in detail in FIG. 2 by way of example, each of the flexible joint 20, 22 includes a bellows-type metal tube 24, and a protective member 26 in the form of a wire mesh for covering an outer surface of the tube 24. The metal tube 24 is welded at its opposite end portions to the corresponding open ends of the adjacent two sections 30, 32, 34 of the exhaust pipe 10. Thus, the flexible joints 20, 22 are adapted to flexibly connect the adjacent sections of the exhaust pipe 10, while maintaining fluid-tightness at the two joints 20, 22 of the pipe 10. The flexible joint 20, 22 further includes a pair of bands 28, 28 for fixing the protective member 26 to the respective end portions of the metal tube 24.

The thus constructed exhaust pipe 10 is installed on the vehicle such that the front section 30 is connected to the engine, while the intermediate and rear sections 32, 34 are suspended from the vehicle body 10, by respective pairs of muffler supports 36, 38, and 40, 42. Various known elastic support structures, such as those as disclosed in laid-open Publication No. 56-70425 of unexamined Japanese Utility Model Application, may be used as the muffler supports 36, 38, 40, 42.

Namely, the rear section 34 of the exhaust pipe 10 is elastically supported by the vehicle body 12, such that the rear section 34 may be oscillated relative to the vehicle body 12, independently of the intermediate section 32 connected to the rear section 34 via the flexible joint 22. In other words, the rear section 34 cooperates with the muffler supports 40, 42 and flexible joint 22 to constitute a vibration system in which the weight of the rear section 34 itself serves as a mass, and the muffler supports 40, 42 and joint 22 serve as a supporting system consisting of spring members for flexibly supporting the rear section 34.

Figure 3:
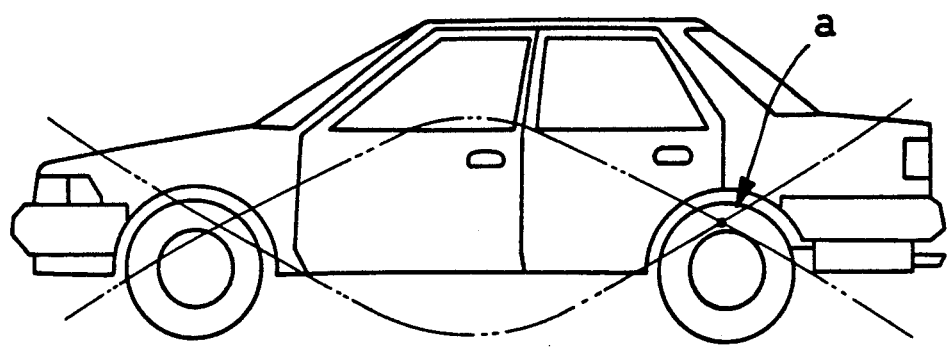
FIG. 3 is a view for explaining a primary natural vibration mode of a vehicle body of an automobile.

With the exhaust pipe 10 thus installed on the vehicle body 12, the flexible joint 22 for connecting the intermediate and rear portions 32, 34 is located in the vicinity of an axle for rear wheels of the vehicle, while the vehicle body 12 has a primary natural vibration mode having a nodal point which lies on the rear axle. While the vehicle is running or in an engine idling condition, the vehicle body 12 is subjected to shakes from the drive line or suspension system, causing the primary natural vibrations which take place in a mode having two nodal points adjacent the respective front and rear axles, as indicated by two-dot chain lines in FIG. 3.

The flexible joint 22 of the exhaust pipe 10 is located adjacent the nodal point "a" of the primary natural vibration mode of the vehicle body 12. Accordingly, the primary natural vibrations of the vehicle body 12 are effectively applied to the above-described vibration system including the rear section 34 of the exhaust pipe 12 which is located rearwardly of the flexible joint 22. Thus, the vibration system which is elastically supported by the vehicle body 12 may be considered as an auxiliary vibration system when the vehicle body 12 is regarded as the primary vibration system of the vehicle.

In the above auxiliary vibration system, the mass of the rear portion 34 of the exhaust pipe 12 and the spring constant of the muffler supports 40, 42 and flexible joint 22 are determined so that the natural frequency of the auxiliary vibration system is tuned to the primary natural frequency of the vehicle body 12. In this manner, the auxiliary vibration system consisting of the rear portion 34, muffler supports 40, 42 and flexible joint 22 functions as a dynamic damper for effectively reducing the vibrations of the vehicle body 10.

In tuning the auxiliary vibration system described above, the natural frequency "f" of the auxiliary vibration system as represented by the following formula (1) is made substantially equal to the primary natural frequency "fo" of the vehicle body 10. Generally, the primary natural frequency "fo" of the vehicle body 10 is about 10–30 Hz, though it varies depending on individual motor vehicles.

$$f = (1/2\pi)(\Sigma K/M)^{\frac{1}{2}} \qquad (1)$$

where, $\Sigma K$: spring constant of the supporting system of the auxiliary vibration system, namely, $\Sigma K = (k1 + k2 + k3)$ where k1, k2 and k3 represent the spring constants of the muffler supports 40, 42 and flexible joint 22, respectively, M: mass of the rear portion 34 of the exhaust pipe 10

In the support structure constructed as described above, a portion (i.e., rear portion 34) of the exhaust pipe 10 is utilized as a dynamic damper for the vehicle body 10. Thus, the dynamic damper may be easily provided at a relatively low cost, without addition of any exclusive damping device or complication of the structure of the vehicle.

In the instant embodiment, the exhaust pipe 10 having a given vibrational mass is split by the flexible joints 20, 22 into three sections, based on the positions of the nodes of the primary natural vibration mode of the vehicle body 10. Therefore, the natural frequency (flexural resonance frequency) of the exhaust pipe as a whole can be tuned to within a comparatively high frequency range in which the vehicle does not suffer from NVH (Noise, Vibration and Harshness), whereby the driving comfort of the vehicle is significantly improved.

The split structure of the exhaust pipe 10 is also advantageous in avoiding breakage of the exhaust pipe, and thereby improving the strength of the exhaust pipe as a whole. Thus, the exhaust pipe of the instant embodiment has a considerably high degree of durability.

While the present invention has been described in its preferred embodiment, for illustrative purpose only, it is to be understood that the invention is not limited to the details of the illustrated embodiment, but may be otherwise embodied.

In the illustrated embodiment, the exhaust pipe 10 consists of the front section 30, the intermediate section 32 and the rear section 34, which are connected to each other by the two flexible joints 20, 22. However, it will be understood from the above description that the exhaust pipe may be split into two or four sections, for example, provided at least the section extending rearwards from a flexible joint which is located adjacent the nodal point of the primary natural vibration mode of the vehicle body 12 is elastically supported by the vehicle body 12, such that the rear section can be oscillated relative to the vehicle body 12.

The construction of the flexible joints for connecting the sections of the exhaust pipe is by no means limited to that of the illustrated embodiment, but may be modified provided the flexible joint allows some degree of oscillation of the rear section of the exhaust pipe relative to the vehicle body. The flexible joint is usually located downstream of a catalytic converter as viewed in the direction of flow of exhaust gases, and therefore need not have a considerably high degree of heat resistance.

In the illustrated embodiment, the muffler supports 36, 38, 40 constitute a structure for elastically supporting the exhaust pipe on the vehicle body. However, the elastic support structure is not limited to the spring members of the illustrated embodiment, but may be selected from various known elastic or spring members, such as rubber bodies or fluid-filled type damping devices. While the rear portion 34 of the exhaust pipe 10 is connected to the vehicle body 12 by the two muffler supports 40, 42 in the illustrated embodiment, the number of the supports is not limited, but may be suitably determined.

It is also to be understood that the construction of the exhaust pipe is by no means limited to that of the illustrated embodiment which is schematically shown in FIG. 1 for illustrative purpose only.

The position of the flexible joint 22 relative to the vehicle body 10 is determined to be in the vicinity of the rear nodal point of the primary natural vibration mode of the vehicle body. However, this never means that the flexible joint must be positioned on the axle of the rear wheels on which the nodal point lies. The exhaust pipe may not be formed to extend straight in the running direction of the vehicle, but is usually formed in curved configuration, as viewed in the plane parallel to the road surface. Accordingly, the position of the flexible joint, and the position of the exhaust pipe relative to the vehicle body should be determined, in view of the configuration of the exhaust pipe.

It is also to be understood that the present invention may be embodied with various other changes, modifications and improvements other than those indicated above, which may occur to those skilled in the art, without departing from the spirit and scope of the invention defined in the following claims.

What is claimed is:

1. A method of supporting an exhaust pipe for an engine of a motor vehicle, on a vehicle body, said method comprising the steps of:
   forming said exhaust pipe such that the exhaust pipe is flexible at an intermediate point thereof in the vicinity of a rear axle of the vehicle, said vehicle body having a primary natural vibration mode having a nodal point on said rear axle of the vehicle, said exhaust pipe having a rear section which extends rearwards from said intermediate point;
   elastically supporting said rear section of said exhaust pipe on said vehicle body, such that said rear section is oscillatable about said intermediate point relative to said vehicle body; and
   tuning a natural frequency of said rear section of said exhaust pipe to a primary natural frequency of said vehicle body, so that said rear section of said exhaust pipe serves as a dynamic damper for said vehicle body.

2. A support structure for supporting an exhaust pipe for an engine of a motor vehicle on a vehicle body, comprising:
   a rear flexible joint disposed so as to flexibly connect an intermediate and a rear section of aid exhaust pipe, said rear flexible joint being located in he vicinity of a rear axle of the vehicle, said vehicle body having a primary natural vibration mode having a nodal point on said rear axle of the vehicle, said rear section extending rearwards from said rear flexible joint; and
   support means for elastically supporting said exhaust pipe on said vehicle body, at a plurality of points of the exhaust pipe on the opposite sides of said rear flexible joint, said support means further comprising vibration damping means comprising at least one spring member which cooperates with said rear section of said exhausted pipe and said rear flexible joint to constitute a vibration system having a natural frequency which is tuned to a primary natural frequency of said vehicle body, wherein said vibration system serves as a dynamic damper for said vehicle body.

3. A support structure as defined in claim 2, further comprising a second flexible joint which flexibly connects said intermediate section and a front section which is connected to said engine of the vehicle.

4. A support structure as defined in claim 2, wherein said rear flexible joint consists of a bellows-type metal tube fixedly connected to said intermediate and rear sections of said exhaust pipe, and a wire mesh for covering an outer surface of said metal tube.

5. A support structure as defined in claim 2, wherein said rear section of said exhaust pipe is provided with a muffler.

6. A support structure as defined in claim 5, wherein said at least one spring member consists of two spring members connected to said muffler.

* * * * *